Jan. 8, 1957 V. J. HUNT 2,776,670
PRESSURE FLUID OPERATED BALANCED CONTROL SYSTEM
Filed Sept. 29, 1951 4 Sheets-Sheet 1

Inventor
Verle J. Hunt
by Bair, Freeman & Molinare
Attys.

Inventor
Verle J. Hunt
by Bair, Freeman & Molinare
Attys.

United States Patent Office 2,776,670
Patented Jan. 8, 1957

2,776,670

PRESSURE FLUID OPERATED BALANCED CONTROL SYSTEM

Verle J. Hunt, Marshalltown, Iowa, assignor to Fisher Governor Company, Marshalltown, Iowa, a corporation of Iowa Application September 29, 1951, Serial No. 248,920

3 Claims. (Cl. 137—86)

This invention relates to a pressure fluid operated balanced control system and particularly to such a system which is adapted to maintain some condition such as temperature, pressure, liquid level, or the like, relatively constant.

The system is applied to a liquid level control in the present application, but it will be obvious as the description progresses that it is not limited thereto, and may respond to and control temperature, pressure or many other conditions.

It is an object of the invention to provide a balanced control system which may operate either on a proportional or reset principle.

It is another object of the invention to provide a fluid pressure operated balanced control system which is used with a transmitter in order to make adjustments and repairs accessible to the operator.

It is a further object of the invention to provide a balanced control receiver responsive to a transmitter which makes it readily possible to indicate or record the controlled condition and all variations thereof, and to obtain such record or indication without it being disturbed by changes in adjustments of the receiver.

It is still a further object of the invention to have a pressure fluid operated balanced control system which substantially eliminates transmission lag between the transmitter and the receiver when the two are spaced a considerable distance apart.

It is an important object of the invention to provide a pressure fluid operated balanced control system which may incorporate automatic droop correction, or reset, in order to overcome the drooping characteristic of certain control systems, when the condition to be controlled is subject to sustained changes which at times cause input and demand to balance above or below the control point.

It is also an object of the invention to utilize bellows to obtain a balanced control system.

It is an additional object of the invention to provide a pressure fluid operated control system which is not complicated, is relatively inexpensive, easy to repair and adjust and not likely to fail or require repairs.

It is also an object of the invention to provide a balanced control system which may be reversed—in other words, in which a valve or the like may be either opened or closed in response to an increase or a decrease in the value or level of the condition to be controlled.

It is a further object of the invention to provide a receiver for a balanced control system which may be adjusted to operate in a snap acting manner.

It is an additional object of the invention to provide a balanced control system in which the proportional band may be adjusted from zero up to two hundred percent.

It is an object of the invention to provide a pressure fluid operated balanced control system wherein bellows are utilized for operating a control lever which, in turn, controls operating fluid pressure in a relay valve for effecting operation of the control element, such as a valve or the like.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1:
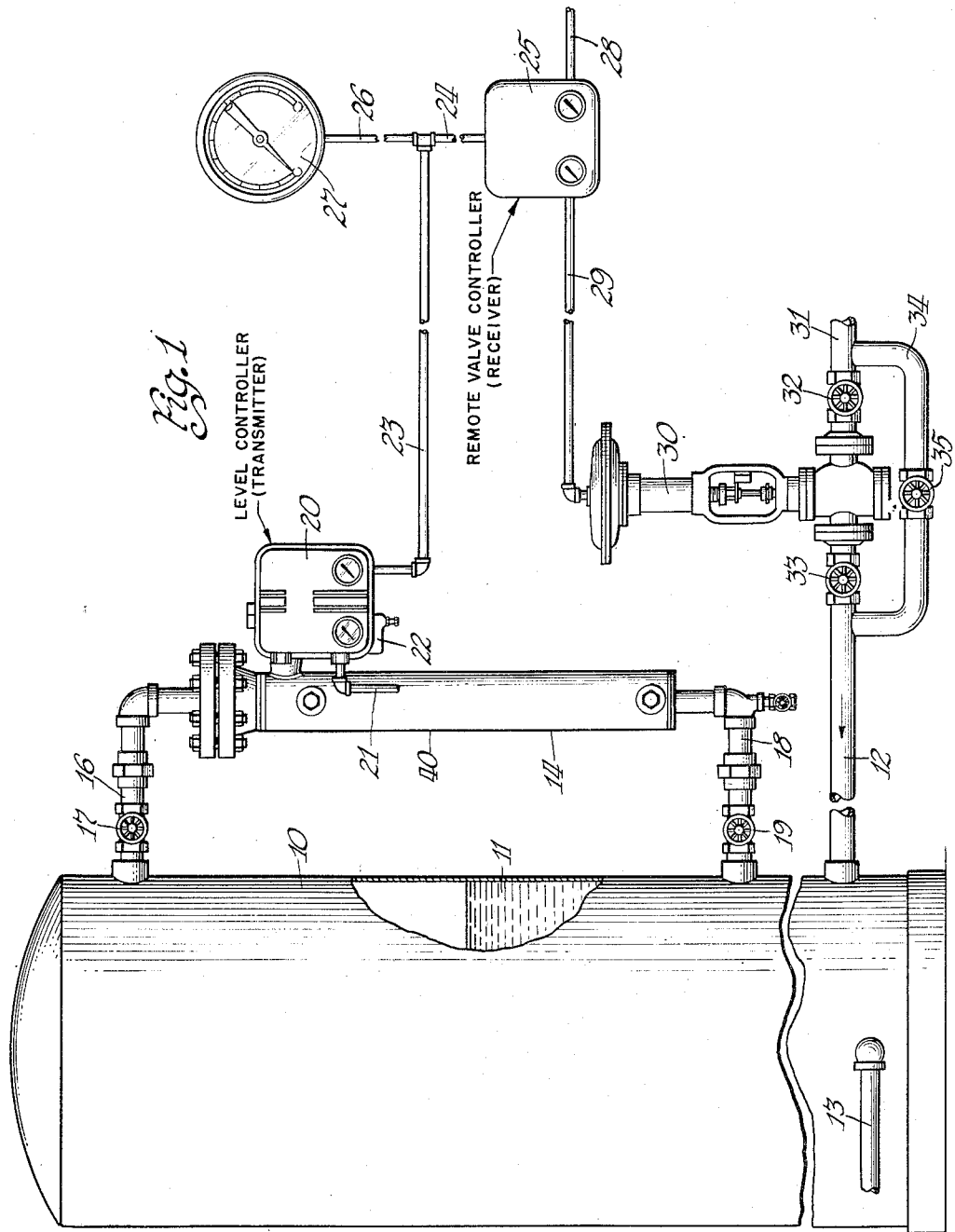
Figure 1 is a view of the control system as applied to a liquid level control.
Figure 2:
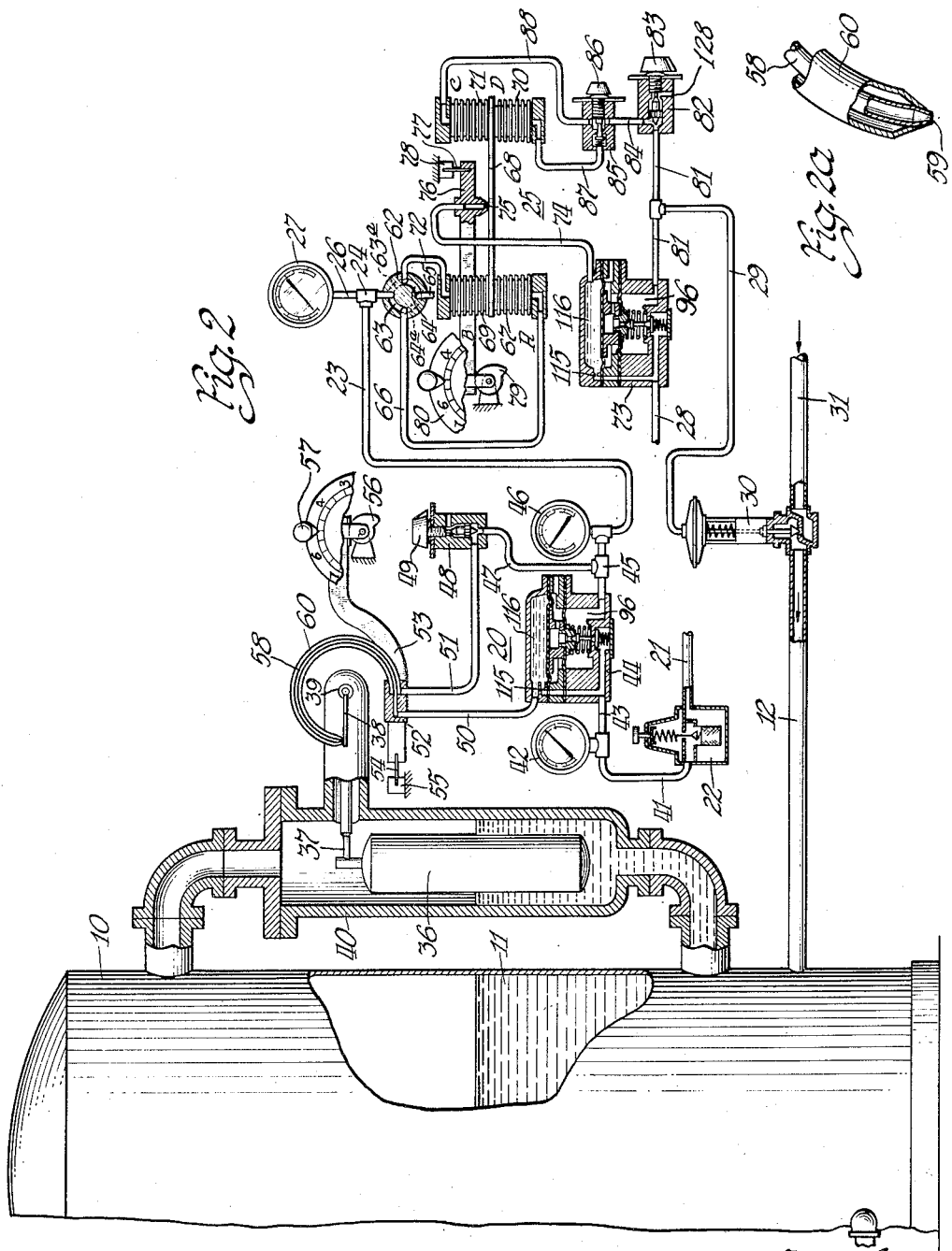
Figure 2 is a diagrammatic view similar to Figure 1 of the balanced control system embodying reset, with many of the parts shown in section.
Figure 3:
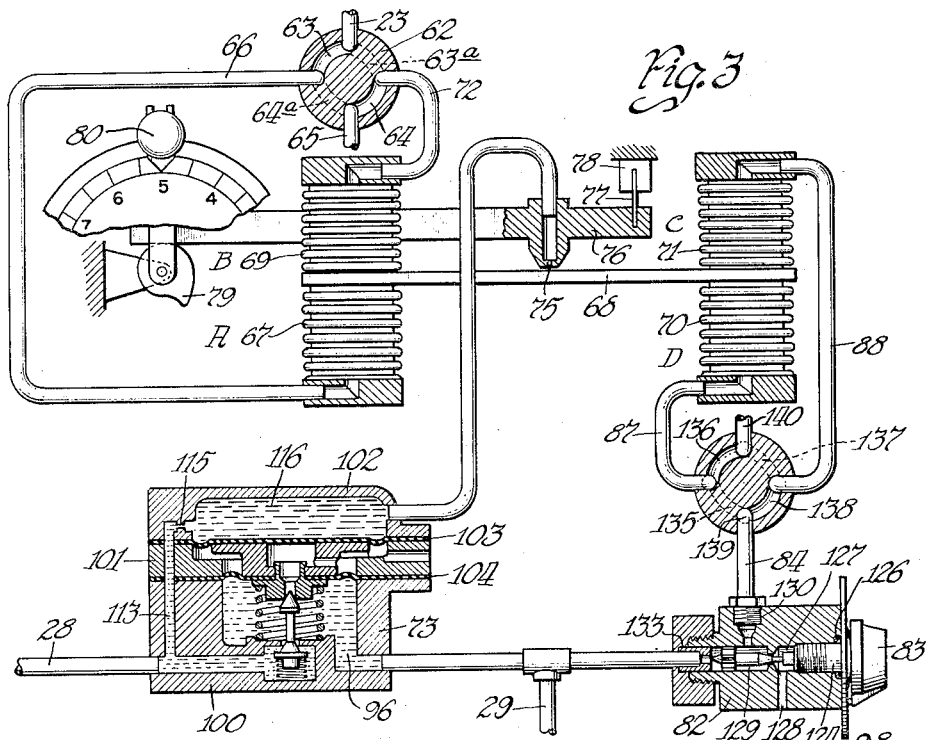
Figure 5:
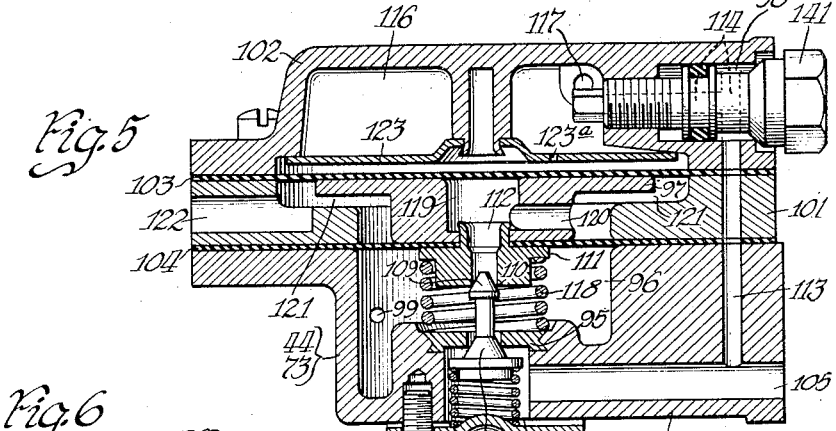
Figure 6:
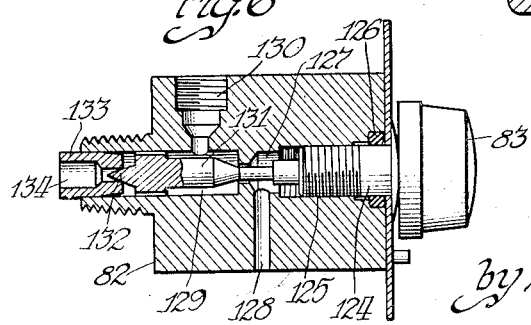
Figure 4:
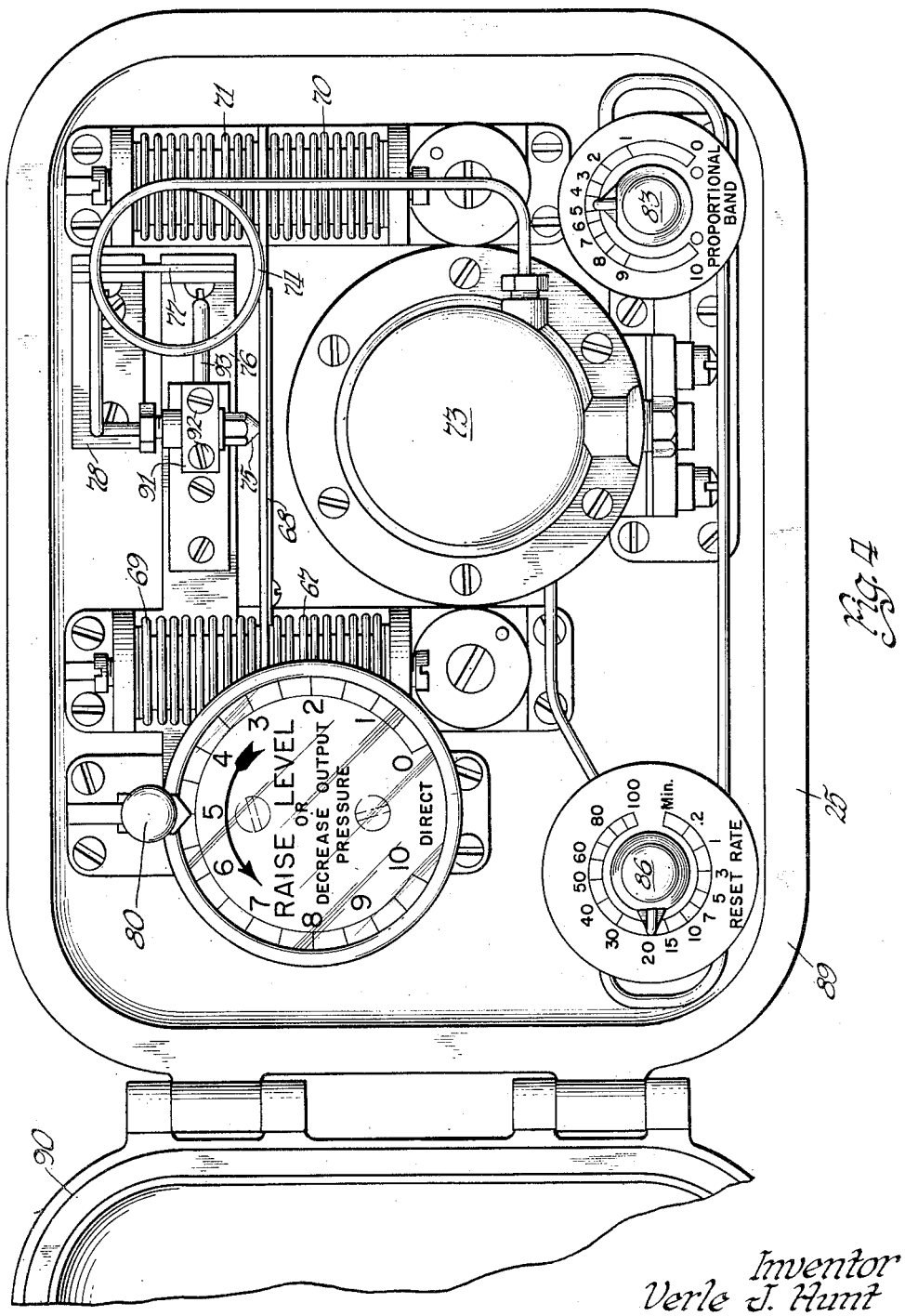

Figure 2-A is an enlarged sectional view of the nozzle associated with the transmitter of Figure 1;

Figure 3 is a view of a control system which operates on the proportional principle without reset;

Figure 4 is a front elevational view of the balanced control mechanism;

Figure 5 is a detail sectional view of a relay valve which may be used in the system; and Figure 6 is a detail sectional view of a proportional band valve which may be used in the system.

For a complete understanding of the invention a number of terms should be defined:

*Drooping characteristic.*—Where a sustained change in operating conditions causes input and demand to balance above or below the control point, the effect is called a "drooping characteristic." The droop at any given time is the difference between the actual temperature or pressure, for example, at which some process is being held, and the temperature or pressure for which the control is set.

*Reset.*—"Reset" is the automatic droop correction which is, in the present case, effected by the pneumatic balance control. It relays the primary control action and provides automatic droop correction. In other words, with a reset type of control the controlled condition may vary temporarily but it is always brought back to the control point before a state of equilibrium is reached in the control circuit. Actually, this is not quite true from a theoretical standpoint because even a reset controller has a basic proportional band.

*Proportional or proportional band.*—In a proportional control, the controlled condition, be it liquid level, pressure, temperature or flow, is held within the limitation of the proportional band. In the case of a float type liquid level controller, such as illustrated herein, which controls the level in a vessel by means of a control valve in the inlet flow line, the level is allowed to vary up or down a distance D corresponding to the proportional band setting. If this distance was, for example, ten inches, it would mean that a ten inch change in level would cause the motor valve in the inlet flow line to move through its entire stroke. In other words, the level might be anywhere within the ten inch band depending upon the particular flow rate required at the moment. This is also sometimes termed "throttling" range, which is the portion of the instrument range which corresponds to full travel of the final control valve from minimum to maximum.

*Transmitter.*—"Transmitter" is the primary control which is responsive to the condition to be controlled and which transmits or relays its response to the balanced control system.

*Receiver.*—"Receiver" is the balanced control system which receives whatever is transmitted from the transmitter to operate the ultimate control mechanism, such as a pneumatic motor control valve.

*Transmission lag.*—If a control valve is remotely located from a point of measurement and the controller being used is of the conventional type located at the point of measurement, it is necessary to transmit a large enough volume of pressure fluid to operate a pneumatic diaphragm motor, for example, at a considerable distance.

This results in a time lag which is termed "transmission lag."

Referring to the drawings for a detailed description of the invention and particularly to Figures 1, 2 and 4, number 10 designates a tank or vessel for containing fluid 11, the level of which is to be controlled in the tank. The tank is provided with an inlet conduit 12 and an outlet conduit 13. The level of the liquid in the tank 10 is controlled by a liquid level measuring device generally indicated by the numeral 14. The device 14 includes a container 40 which is connected, at its top by a conduit 16 having a valve 17 therein, to the top of the vessel 10. The device 14 is connected at its bottom to the vessel 10 by a conduit 18 having a valve 19 therein.

The level controller or transmitter, which also may be termed the primary control device, is indicated generally at 20. It is connected to a source of air under pressure by means of a conduit 21 and a filtering and pressure reducing device 22. The fluid under pressure may be supplied to the transmitter 20 at a supply pressure of from 40 to 100 p. s. i.

A conduit 23 and a conduit 24 extend between the transmitter 20 and the remote valve controller or receiver 25 which contains the pneumatic balanced control. A branch conduit 26 leading from conduit 23 is connected to a pressure gauge 27 which, of course, may be replaced with a continuous pressure recorder, if desired.

Supply air for the receiver 25 is connected thereto by a conduit 28 and may be maintained at approximately 20 p. s. i. A compressed air conduit 29 connects the receiver 25 with a pneumatically operated motor valve 30 to control the flow of liquid through the conduit 12. A supply conduit 31 is connected to one side of the motor valve 30 with a valve 32 interposed. A valve 33 is likewise interposed between the other side of the motor valve 30 and the inlet conduit 12. A bypass 34 with a valve 35 therein connects conduits 12 and 31 around the motor valve 30.

Referring now primarily to Figures 2 and 4, a float 36 is provided within the float container 40 and since liquid is present in the container 40 at the same level as in the vessel 10, the float rises and falls with the level of the liquid in the vessel 10. The float 36 is connected to a horizontal member 37 which is pivoted on a projection of casing 40 at 39. A blade 38 is connected to the pivoted member 37 outside casing 40 and rotates around the pivot 39 as the float 36 rises and falls.

As stated above, supply air for the transmitter is supplied through conduit 21 and combination filter and reducing valve 22. Since the reducing valve 22 forms no part of the invention and is a standard item no further description is necessary. A conduit 41 connects the filter with an indicator 42 which indicates supply pressure after it has been reduced by the reducing valve 22. A conduit 43 connects conduit 41 with a transmitter relay valve shown at 44 and a conduit 45 connects the other side of the relay valve 44 to a gauge 46 which indicates the pressure which is supplied by the relay valve to the receiver 25 through the conduit 23. The relay valves per se form no part of the present invention.

A conduit 47 connects conduit 45 with a proportional band control valve indicated generally at 48. The proportional band control valve 48 is provided with an adjusting knob 49. Another portion of the relay valve 44, which will be described in detail later, is connected to a block 52 through a conduit 50. The block 52 is a part of a rotatable arm 53 which is supported on a flexible member 54 and has one end rigidly held at 55. The other end of the arm is supported on a rigidly supported cam 56 which is adapted to be rotated by movement of a control arm 57 to raise or lower arm 53 about the resilient support 54. Conduit 50 connects with a curved conduit 58 which terminates in a nozzle 59 which is adapted to be opened or closed by the blade 38. A conduit 51 connects the proportional band valve 48 to the block 52 that also supports a Bourdon tube 60, which Bourdon tube 60 encompasses the conduit 58 and connects with the conduit 51. The Bourdon tube 60 carries the nozzle 59 at its free end, and moves the nozzle in accordance with the pressure in the Bourdon tube.

Conduit 23 which connects the transmitter 20 and the receiver 25 is connected to a reversing valve 62 of the receiver 25. The reversing valve has passages 63 and 64 which are effective at one particular time and passages 63a and 64a, shown in dotted lines, which are effective when it is desired to reverse the operation of the control system. A conduit 65 is connected to the reversing valve passage 64 or 64a and conduit 65 may be vented to atmosphere, or may be connected to a source of control pressure to adjust the receiver control in a manner hereinafter described. A conduit 66 is connected to passage 63 in the reversing valve 62 at one end and at the other end connects with the interior of a bellows 67. A freely movable control arm 68 is positioned at one end between the bellows 67 and an upper bellows 69 and at the other end between a lower bellows 70 and an upper bellows 71. Control arm 68 may be termed a secondary control member.

A conduit 72 connects passage 64 in reversing valve 62 with the interior of the upper bellows 69.

The supply conduit 28 is connected to a relay valve of the receiver 25, indicated generally at 73. The upper part of the relay valve 73, which will be described later, is connected by a conduit 74 to a nozzle 75 contained in a rotatable arm 76. The arm 76 at one end is carried by resilient support 77 which is secured to a rigid mounting 78. The other end of the arm 76 is supported by a rigidly mounted cam 79 which may be turned by rotation of a control knob 80 to raise and lower one end of the arm 76.

The other side of the relay 73 is connected by a conduit 81 to conduit 29 which conveys fluid under pressure to the motor valve 30, to thus operate the motor valve and determine the rate of flow of liquid from conduit 31 to conduit 12 and thence into vessel 10. Conduit 81 also connects with a proportional band control valve 82 which is provided with a control knob 83. A conduit 84 connects the proportional band valve 82 with a reset rate control valve 85 which is provided with a control knob 86. The reset rate control valve 85 is connected to the interior of the lower bellows 70 by a conduit 87. Another conduit 88 connects another portion of the reset rate control valve 85 with the interior of the upper bellows 71 and whatever pressure exists in conduit 84 leaving from the proportional band control valve 82 also exists in conduit 88.

Referring to Figure 4, the remote valve controller or balanced pneumatic receiver 25 is contained within a casing 89 having a hinged door 90 thereon. The nozzle 75 is secured to the arm 76 by means of a block 91 which is attached to the arm by screws 92. The arm 76 is provided with a slot 93 in which the block 91 is adapted to slide, so that the nozzle 75 may be variably positioned with respect to the control arm 68. As will be explained hereinafter, this adjustment provides for a proportional band of over one hundred percent.

Referring now to Figure 5 for a detailed description of the valve relays 44 and 73, which are identical, the relay valve comprises a lower casting 100, an intermediate casting 101 and an upper casting 102. A flexible diaphragm 103 is secured between the members 101 and 102 and a second diaphragm 104 is secured between the members 100 and 101. It is to be noted that the effective area of the upper diaphragm 103 is greater than that of the lower diaphragm 104.

The lower casting 100 is provided with a horizontal passage 105 which is adapted to connect with the supply air. The passage 105 communicates with a chamber 106 which encompasses the lower part of a valve member 107 which is provided with a valve seat 95. A spring 108 tends to force the valve member 107 upwardly into contact with its seat 95. A chamber 96 is formed in the casting 100 between the diaphragm 104 and valve seat 95. An upper portion 109 of valve 107 extends into the chamber 96 and into a passage 112 in a valve seat member 110 which is secured to the diaphragm 104. The passage 112, therefore, affords communication between the chamber 96 and a chamber 121 formed in the intermediate casting 101. An outlet 99 is provided from chamber 96.

A spring 118, extending between valve seat member 95 and valve seat member 111, tends to force the diaphragm 104 upwardly. A member 97 connects the diaphragms 103 and 104 together so that movement of one is transmitted to the other. As stated, the passage 112 communicates with the chamber 119 which in turn communicates with the passage 120 formed in the diaphragm connecting member 97. The passage 120 in turn connects with chamber 121 and a passage 122 formed in the intermediate casting 101. Passage 122 is vented to atmosphere.

A passage 113 extends through all three of the castings 100, 101 and 102 and also through diaphragms 103 and 104 and connects passage 105 with a chamber 98 formed in the side of the upper casting 102. A plug 141, having passages 114 therein, communicates with the passage 113. The horizontal passage 114 is restricted, as shown diagrammatically at 115. The restricted opening 115 communicates with a chamber 116 formed in the upper casting 102 and having an opening therefrom shown at 117. The opening 117 is adapted to communicate with conduit 50 of relay valve 44 and 74 of relay valve 73 and the opening 99 is adapted to connect with conduit 45 of relay valve 44 and 81 of relay valve 73. A baffle plate 123 having an opening 123a therein is positioned in the chamber 116 above the diaphragm 103 to reduce the possibility of heavy pulsations being transmitted to the diaphragm 103.

Referring to Figure 6 for a detailed description of the proportional band control valve 82, a plug 124 having threads 125 thereon which engage with threads in a bore 127 is secured to the adjusting knob 83. Packing 126 is provided. A passage 128 communicates with the chamber 127, which passage 128 is vented to atmosphere. A valve member 131 is secured to the rotatable plug 124 and is provided with a needle valve 132 at its outer end which cooperates with seat member 133 having a passage 134 therein. The valve member 131 is disposed within a chamber 129 formed in the valve body 82 and chamber 129 communicates with a passage 130. The passage 130 is adapted to be connected to conduit 84 and passage 134 with conduit 81.

The proportional band control valve 48 is identical with the valve 82 and in this case passage 130 is adapted to connect with conduit 51 and passage 134 with conduit 47.

Referring to Figure 3 for a detailed description of the second embodiment of the invention, in which reset is not present, all parts are identical and are given the same numbers, except that the reset rate valve 85 is replaced by a reversing valve member 135. The reversing valve member 135 is identical with the reversing valve member 62, shown in Figure 2, and includes passages 136 and 138 which convey fluid in one position of the valve 135, and passages 137 and 139, shown in dotted lines, which convey fluid in another position of the valve 135. In the position shown, conduits 84 and 88 connect with passage 138 and conduit 87 connects with passage 136. A conduit 140 also connects with passage 136 and is vented to atmosphere.

Operation

Referring to Figure 2 for a detailed description of the operation of the embodiment of the invention which operates on the reset principle, assuming that the liquid level falls in the vessel 10, the float 36 will be lowered, thus rotating blade 38 and opening nozzle 59 at the end of conduit 58. The conduit 58 has fluid under reduced pressure therein. The pressure is, therefore, reduced in conduits 58 and 50, thereby reducing the pressure in chamber 116 of relay valve 44 above the diaphragm 103. The diaphragm assembly, therefore, rises and unseats valve 109 so that air is bled from chamber 96 through passages 112, 120, 121 and 122 to atmosphere. This results in a decrease in pressure in conduits 45 and 23 leading to the receiver 25.

When the liquid level rises in tank 10, float 36 also rises and closes nozzle 59 in conduit 58. This increases the pressure in conduits 58 and 50, and in chamber 116 above diaphragm 103. This increase in pressure in chamber 116 causes the diaphragm assembly to move downwardly, thus seating valve 109, if it is still open, and unseating valve 107. Supply air from conduit 43 enters passage 105 of relay valve 44 and is conveyed through chamber 106 and chamber 96, through outlet 99, which is connected to conduits 45 and 23, thus increasing the pressure transmitted to the receiver 25.

It is to be noted that in the installation disclosed, pneumatically operated valve 30 is closed by an increase in pressure and is opened by a decrease in pressure, because the spring of the valve tends to force the valve to the open position. A decrease in pressure transmitted to the receiver 25 tends to open the valve 30 and an increase to the receiver 25 tends to close the valve 30 as will be apparent as the description progresses.

The receiver 25 is constructed in this instance to take a throttling air pressure from three to fifteen pounds and in turn sends an output to the control valve 30, or to some other controlling or indicating means, that is a function of the input from the transmitter 20. The bellows 67 on the lower left hand side of the receiver 25 receives the transmitted input pressure from the transmitter 20 through passage 63 of reversing valve 62 and through conduit 66. Upper bellows 69 on the left hand side merely acts as a spring and is vented to atmosphere through conduits 72, passage 64 and conduit 65. The upper bellows on the right hand side of the receiver 25 is connected by the conduit 88 to the reset valve 85, which is in turn connected by a conduit 84 to the proportional band valve 82 having a vent 128 to atmosphere. The lower bellows 70 of receiver 25 is connected by a conduit 87 to the reset valve 85 and through a restricted opening to conduit 84 which connects with proportional band valve 82 which, as stated, has a vent 128 to atmosphere. Both the valves 82 and 85 are connected to chamber 96 of relay valve 73, so that a decrease in pressure in that chamber decreases the pressure in bellows 70 and 71, but decreases it more quickly in bellows 71, because of the restriction in valve 85. Likewise an increase in pressure in the chamber 96 of relay valve 73 is reflected in an increase in the pressure in bellows 70 and 71 but again the increase is reflected more quickly in bellows 71 than in bellows 70.

The nozzle 75 of the receiver 25 is of such size that all of the air pressure introduced through the restriction 115 of relay valve 73 will bleed out of the nozzle 75 without any build up in the conduit 74 and chamber 116 of relay valve 73.

As the transmitted pressure is increased in bellows 67, nozzle 75 is partially closed by the bar 68 and pressure is built up in chamber 116 of relay valve 73 through restriction 115. The build up in pressure forces the diaphragm assembly of relay valve 73 downwardly unseating valve 107 and permitting 20 p. s. i. air supply to flow through and into the chamber 96, outlet 99 and conduits 81 and 29, to the top of the diaphragm motor valve 30, thereby tending to close the valve 30 and decrease the supply of fluid to vessel 10.

Pressure is also increased through the proportional band control valve 82, conduit 84, reset valve 85, conduit 88 and bellows 71 by an amount that is proportional to the setting of the proportional band valve 82. The increase in pressure in bellows 71 causes the bar 68 to be moved downwardly opening the nozzle 75 and stopping any further increase in pressure build up in conduit 74 and chamber 116 of relay valve 73. This results in the control valve 30 being set at a new position.

Upon a decrease in pressure through conduit 23 from the transmitter 20, the opposite effect will result, that is, the motor valve 30 will tend to open because the pressure will decrease in bellows 67, bar 68 will be moved downwardly to open nozzle 75, and the diaphragm assembly of relay valve 73 will be moved upwardly to unseat valve 109 and bleed air from conduit 29, 81, chamber 96 of relay valve 73 to atmosphere through passages 112, 120, 121, and 122 of the relay valve. The pressure on the top of the motor diaphragm valve thus being decreased, the spring of the valve will open it and will permit more liquid to be delivered to the vessel 10. Pressure is also decreased in bellows 71 faster than in bellows 70 and bar 68 is moved to close nozzle 75 and bring the system to equilibrium.

The needle valve of the reset valve 85 acts to provide a proportional action by virtue of a pressure build up in the bellows 71 but, as the pressure is equalized in bellows 70 and 71 through the needle valve, the proportional effect is nullified and the controlled condition is brought back to the control point.

The purpose of the reversing switch 62 is to reverse the action of the receiver 25, so that an increase in pressure transmitted thereto will tend to open the motor valve 30 and a decrease in pressure tend to close it. The reversing valve 62 is a four-way valve which interchanges the leads to the bellows 67 and 69, so that the transmitter input may be applied to either of them. If the passages are changed to those viewed in the dotted lines, the transmitter pressure will be supplied to bellows 69 and bellows 67 will be vented to atmosphere. Therefore, an increase in transmitter input will result in a decrease in pressure to the control valve 30 and vice versa.

The purpose of the proportional band adjustment valve 82 is to change the ratio of transmitter input air to the air pressure sent to the control valve 30. If the proportional band valve 82 is in the position to the extreme right as shown in Figure 6 so that the bleed port 128 is entirely closed, then the pressure in conduits 81 and 84 will be identical and the maximum possible build up of pressure is obtained in the bellows 71. Since the bellows 67, 69, 70 and 71 are identical and assuming that the nozzle 75 is spaced exactly midway between them, the change in pressure to the motor control valve 30 will be exactly the same as the change in the transmitter input, which is the 100% proportional band setting.

If the proportional band valve 82 is positioned to the left, as shown in Figure 6, so that the conduit 81 is completely closed off, no air pressure will be delivered to bellows 70 or 71 and it would require but very small air pressure change in transmitter input to obtain a full three to fifteen pounds change to the control valve 30. This would result in the narrowest possible proportional band setting which may be considered as substantially zero percent. With any setting of the needle valve of the proportional band valve 82 between the two extremes stated above, the pressure in conduit 84 will be some value less than the pressure in conduits 81 and 29 which lead to the diaphragm of the control valve 30. Therefore, the proportional band may be adjusted from the very narrow range at one extreme to 100 percent at the other extreme.

The receiver 25 also has incorporated therein a further proportional band adjustment which is accomplished by sliding the nozzle 75 along the arm 76 by means of the attachment 91, 92 and 93 described above. By moving the nozzle to the extreme right as viewed in Figure 4, it is possible to increase the proportional band to 200 percent with the result that with twelve pounds change in transmitter input only six pounds change would be sent to the diaphragm of the control valve 30.

The bellows 69 is normally vented to atmosphere, if used as shown in Figure 2, but it may be utilized to pneumatically set the control point. If the bellows 69 is connected to a variable air pressure supply it is obvious that by changing the pressure required in bellows 67 to close the nozzle 75, the control point will be varied. This could be accomplished by utilizing a regulator remote from the instrument, if desired.

The control point of the level setting mechanism shown at 80 in Figure 4 merely rotates the cam 79 to raise or lower the bar 76, thus raising or lowering the nozzle 75 with respect to the bar 68 and thus determining the pressure that is required in bellows 67 or 69, depending upon the position of the reversing valve 62, in order that the bar 68 will close or restrict the nozzle 75.

Referring to the operation of the proportional pneumatically balanced control system shown in Figure 3, it is to be understood that the same transmitter system may be utilized and connected to the conduit 23. The only difference in the system shown in Figure 3 over that shown in Figure 2 is that the reset valve 85 is eliminated. If desired, a second reversing switch 135 is used between the proportional band valve 82 and the bellows 70 and 71 and is connected as described herein.

In the system shown in Figure 3, only two of the four bellows are actually used. The bellows 67 on the lower left hand side receives the transmitted input pressure range of three to fifteen p. s. i. The upper bellows 71 on the right hand side is used as the compensating member. Bellows 69 and 70 are vented to atmosphere and merely act as springs. The proportional band adjustment valve 82 operates in the same manner as disclosed with respect to Figure 2 as does the relay 73 and the receiver is connected to a motor valve 30 through conduit 29 in the same manner as shown in Figure 2.

In operation, as transmitted pressure is increased to bellows 67, nozzle 75 is partially closed off by bar 68 and pressure is built up in the chamber 116 of relay valve 73, Figure 3. The diaphragm assembly of the relay valve 73 is therefore forced downwardly, unseating valve 107 to permit 20 p. s. i. air supply to flow through the relay to the motor valve 30, thus tending to close the motor valve. Pressure is also increased through the proportional band valve 82 by an amount that is proportional to the setting of the valve. Thus the pressure is increased in bellows 71 which causes the bar 68 to be moved downwardly opening nozzle 75 and stopping any further increase in pressure build up in chamber 116 of the relay valve 73. A decrease in pressure to bellows 67 in Figure 3 reverses the above condition in that nozzle 75 is opened and the operation follows that of Figure 2 except that bellows 70 is merely a spring and no reset action is obtained.

As stated with respect to Figure 2, the purpose of the reversing valve 62 is to change the system so that increase in transmitter pressure will result in decrease in pressure to the control valve. Again the reversing valve 62 is a four-way valve which interchanges the leads to the bellows 67 and 69 so that the transmitter input may be applied to either of them.

The reversing valve 135 is of the same construction as the reversing valve 62 and may be utilized if desired to also interchange the pressures in the bellows 70 and 71. As the pressures are interchanged in bellows 70 and 71, an off and on snap acting instrument will result, rather than a throttling proportional instrument. When the circuit is arranged to operate as a snap acting unit, as the transmitter pressure is increased in bellows 67, the bar 68 moves upwardly to close nozzle 75, building up pressure in the chamber 116 of relay valve 73, which unseats the valve 107 which tends to increase pressure to the control valve 30 and through the proportional band valve 82 into the bellows 70. This will cause the bar 68 to move further upwardly, further closing nozzle 75 and causing a greater build up of pressure in chamber 116 of the relay 73 in Figure 3. Since the effect is cumulative the result is that the diaphragm assembly of relay valve 73 in Figure 3 will be forced downwardly to the full extent of its travel and 20 p. s. i. air supply will be immediately applied to the diaphragm and the control valve 30 and to the bellows 70. This results in a snap acting or an on and off control unit.

It is obvious from the foregoing description that in the embodiment of the invention shown in Figure 2 wherein the control system embodies reset that the proportional effect first moves the valve in accordance with the change in controlled condition and the reset effect causes the valve to move an additional distance until the controlled condition is brought back to its original status. In other words, in the opposed bellows system shown in Figure 2 a proportional action from the proportional bellows is immediately obtained upon a change in controlled condition and as the pressure is equalized through the needle valve between the proportional bellows and the reset bellows, the motor valve is further moved to bring the controlled condition back to the set point.

Furthermore, when the transmitter is set at the 100 percent proportional band, a 100 percent change in the controlled condition results in from 3-15 p. s. i. output to the receiver controller. This output then becomes a linear measurement of the controlled condition and may be used as such. Also changes in control adjustments such as the control point and proportional band are made in the receiver controller and do not disturb the record coming from the transmitter. It is, therefore, possible to indicate or record the controlled condition and all variations thereof and to obtain such record or indication without it being disturbed by changes in adjustments of the receiver.

It is also obvious from the foregoing description that the receiver may be placed close to the motor valve and that the transmission lag between the transmitter and receiver is eliminated.

Some changes may be made in the construction and arrangement of the parts of my device without departing from the real spirit and purpose of my invention, and it is my invention to cover by my claims any modified forms of structure or use of mechanical equivalents which may be reasonably included within their scope.

I claim as my invention:

1. In a system comprising pressure responsive means adjustable to affect the magnitude of a condition and a primary control member positioned in accordance with the existing magnitude of said condition, a secondary control member, a pair of pressure responsive devices opposed in their effects upon said secondary control member, a first source of pressure, means in operative communication with said source of pressure for supplying varying pressures to one of said pressure responsive devices upon variations in the magnitude of said condition as determined by said primary control member, said one pressure responsive device being adapted to move said secondary control member upon variations in pressure supplied to said one pressure responsive device, a pair of separate pressure responsive biasing devices opposing the force on said secondary control member of each of said pressure responsive devices, a valve connected to a second source of pressure and to said second pressure responsive device, said second source of pressure being independent of said first source, means for effecting movement of said valve upon movement of said secondary control member, said valve, upon movement in one direction, increasing the pressure supplied to said second pressure responsive device, said valve, upon movement of said secondary control member in the opposite direction, affording decrease of the pressure supplied to said second pressure responsive device, and means for connecting said pressure responsive means to said valve, movement of said valve in said first direction also increasing the pressure supplied to said pressure responsive means to move it in one direction and movement of said valve in the opposite direction decreasing the pressure supply to said pressure responsive means to move it in the opposite direction, one of said secondary pressure responsive devices and one of said biasing devices being disposed on opposite sides of said secondary controlling member at each end thereof, the remaining portions of said secondary control member being freely suspended.

2. In a system comprising pressure responsive means adjustable to affect the magnitude of a condition and a primary control member positioned in accordance with the existing magnitude of said condition, a secondary control member, a pair of pressure responsive devices opposed in their effects upon said secondary control member, a source of pressure, means in operative communication with said source of pressure for supplying varying pressures to one of said pressure responsive devices upon variations in the magnitude of said condition as determined by said primary control member, said one pressure responsive device being adapted to move said secondary control member upon variations in pressure supplied to said one pressure responsive device, a valve connected to a second source of pressure and to said second pressure responsive device, said secondary source of pressure being independent of said first source and of different magnitude, a conduit for conveying pressure fluid having an outlet adjacent said secondary control member, a portion of said valve being in communication with said second source of pressure, a restriction between said second source of pressure and said portion of the valve, said conduit connecting with said portion of the valve, whereby movement of said secondary control member with respect to the outlet of said conduit determines the pressure in said conduit and in said portion of the valve, means for effecting movement of said valve in response to pressure changes in said conduit and said portion of the valve, said valve, upon movement in one direction, increasing the pressure supplied to said second pressure responsive device, said valve, upon movement of said secondary control member in the opposite direction, affording decrease of the pressure supplied to said second pressure responsive device, means for connecting said pressure responsive means to said valve, movement of said valve in said first direction also increasing the pressure supplied to said pressure responsive means to move it in one direction and movement of said valve in the opposite direction decreasing the pressure supply to said pressure responsive means to move it in the opposite direction, one of said secondary pressure responsive devices being disposed on one side of said secondary control member at one end thereof and the other of said secondary pressure responsive devices being disposed on the other side of said secondary control member at the other end thereof and adjustable means affording change in the position of the outlet of said conduit linearly with respect to the secondary pressure responsive devices.

3. In a system comprising pressure responsive means adjustable to affect the magnitude of a condition and a primary control member positioned in accordance with the existing magnitude of said condition, a secondary control member, a pair of pressure responsive devices opposed in their effects upon said secondary control member, a first source of pressure, means for supplying varying pressures to one of said pressure responsive devices upon variations in the magnitude of said condition as determined by said primary control member, said one pressure responsive device being adapted to move said secondary control member upon variations in pressure supplied to said one pressure responsive device, a pair of separate pressure responsive biasing devices opposing the force on said secondary control member of each of said pressure responsive devices, a valve connected to a second source of pressure and to said second pressure responsive device, said second source of pressure being independent of said first source, means for effecting movement of said valve upon movement of said secondary control member, said valve, upon movement in one direction, increasing the pressure supplied to said second pressure responsive device, said valve, upon movement of said secondary control member in the opposite direction, affording decrease of the pressure supplied to said second pressure responsive device, means for connecting said pressure responsive means to said valve, movement of said valve in said first direction also increasing the pressure supplied to said pressure responsive means to move it in one direction and movement of said valve in the opposite direction decreasing the pressure supply to said pressure responsive means to move it in the opposite direction, one of said secondary pressure responsive devices and one of said biasing devices being disposed on opposite sides of said secondary controlling member at each end thereof, the remaining portions of said secondary control member being freely suspended, and valve means communicating with one of said pressure responsive biasing devices for reversing the operation of the primary control member with respect to an increase or decrease in pressure supply.

References Cited in the file of this patent

UNITED STATES PATENTS

| | | |
|---|---|---|
| 1,220,972 | Fulton | Mar. 27, 1917 |
| 1,988,348 | Annin | Jan. 15, 1935 |
| 2,065,702 | Hubbard | Dec. 29, 1936 |
| 2,285,540 | Stein et al. | June 9, 1942 |
| 2,356,970 | Brockett | Aug. 29, 1944 |
| 2,409,871 | Krogh | Oct. 22, 1946 |
| 2,476,104 | Mason | July 12, 1949 |
| 2,512,561 | Ziegler | June 20, 1950 |
| 2,737,964 | Olah | Mar. 13, 1956 |

FOREIGN PATENTS

| | | |
|---|---|---|
| 536,537 | Great Britain | May 19, 1941 |
| 544,753 | Great Britain | Apr. 27, 1942 |

OTHER REFERENCES

Masoneilan Temperature Control Bulletin No. 3000c, 1934, pages 6, 7, 17. (Copy in 236–82.)

Moore Products Co., Philadelphia, Pa., Nullmatic Controller Instructions 505S, 1948, pages 2–7, 11, 23. (Copy in 137–86.)